United States Patent Office 3,338,915
Patented Aug. 29, 1967

3,338,915
CERTAIN CYANOALKENYLTETRAZOLES AND THEIR PREPARATION
Morton Brown, Wilmington, Del., assignor to E. I. du Pont de Nemours and Company, Wilmington, Del., a corporation of Delaware
No Drawing. Filed Jan. 24, 1962, Ser. No. 168,539
16 Claims. (Cl. 260—299)

This invention relates to new tetrazole compounds, which are characterized by a cyanovinyl group in the 5-position, and to the preparation of these compounds.

Tetrazoles display an unusual structure for organic compounds since they have a nucleus of four nitrogens and one carbon. Some of the tetrazoles have found utility as medicinals. Further, their high nitrogen content has enabled them to be utilized in propellant compositions, as has been demonstrated in U.S. Patent 2,480,852.

Heretofore preparation of tetrazoles has involved hazardous operating conditions, i.e., employment of an azide or hydrazoic acid at elevated temperatures. Less dangerous routes have generally given low yields of tetrazoles.

It is an object of this invention to provide new and useful tetrazoles containing a cyanovinyl group located in the 5-position. It is a further object of this invention to provide a process for preparing these compounds which is more simple and less hazardous than conventional tetrazole syntheses. Other objects will appear hereinafter.

These and other objects of this invention are accomplished by providing new tetrazoles bearing a cyanovinyl group of the structure (NC)C(X)=C(Y)—, wherein X represents chlorine, fluorine, cyano, cyanocarbyl, hydrocarbylsulfonyl or perfluoroalkyl, and Y represents chlorine, fluorine, cyano, hydrocarbylsulfonyl or perfluoroalkyl in the 5-position, i.e., attached to nuclear carbon. These tetrazoles are represented by the general formula

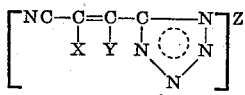

wherein X and Y are defined as above and Z is a positive ion, including metals and hydrogen, or alkyl group as exemplified by the salts, free acid, or alkyl derivatives of the tetrazole.

The new tetrazoles are prepared by reaction of an alkali metal or ammonium azide with a polycyanoethylene of the formula (NC)C(X)=C(Y)CN (X and Y are defined above) in an inert liquid solvent. In this reaction the polycyanoethylenic compounds and azide ion, generally as alkali metal or ammonium salt, react in equimolar ratios to produce the new tetrazoles. In addition to tetracyanoethylene, hexacyanobutadiene, and 1,2-dicyano-1,2-p-toluenesulfonyl ethylene, other hydrocarbylsulfonyl and cyanocarbyl ethylenes can be employed, e.g., dimethylsulfonyl dicyanoethylene, diethylsulfonyl dicyanoethylene, or diallylsulfonyl dicyanoethylene (obtained by reaction of the corresponding hydrocarbonsulfinic acid sodium salt with 1,2-dichloro-1,2-dicyanoethylene), chlorotricyanoethylene, and 1,2-dicyano-1,2-di(perfluoroalkyl)ethylenes. Hydrocarbylsulfonyls of up to seven carbons in the hydrocarbon group, cyanocarbyls of up to four carbons, and perfluoroalkyls of up to three carbons are preferred for the carbon content of these groups.

The reaction takes place in liquid phase. The solvent employed is inert and is preferably a lower alkanoamide or nitrile. Suitable solvents are dimethylformamide, dimethylacetamide, diethylformamide, tetramethylurea, acetonitrile, propionitrile, tetrahydrofuran, and ethylene glycol dimethyl ether. The particularly useful solvents are those that have an appreciable vapor pressure at 100° C. or below to permit their removal by evaporation from the reaction product during purification of the product.

Temperatures employed for the reaction should be low in order to obtain high yields. The preferred temperature is below 10° C., but the range from —40 to +30° C. can be used. Although higher and lower temperatures can be employed, they generally require longer times or give lower yields. High temperatures lead to low yields through decomposition reactions.

For convenience, the reaction is carried out at normal pressures although lower pressure and superatmospheric pressure can be used.

The polycyano compound and azide undergo the desired reaction in an equimolar ratio. Although ratios of the order of 5:1 to 1:5 can be used, it is preferred to use a slight excess of azide. The reaction products are generally isolated by removal of the solvent. The tetrazoles of this invention are obtained at first as salts of low volatility from which the volatile solvent can be removed. The solvent is preferably removed by evaporation at low temperatures since generally the tetrazoles are unstable at about 80–100° C. or higher. For this reason the solvent selected has considerable vapor pressure at below 100° C.

The following examples further illustrate the preparation and properties of the new cyanovinyltetrazoles.

EXAMPLE I

*5-tricyanovinyltetrazole from sodium azide and tetracyanoethylene in dimethylformamide*

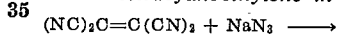

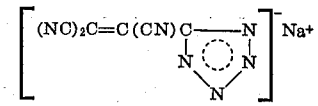

A mixture of 7.5 g. of sodium azide and 50 ml. dry dimethylformamide was cooled to 0° to —10° C. in a nitrogen atmosphere. A solution of 12.8 g. of tetracyanoethylene in 50 ml. dry dimethylformamide was added dropwise for one hour. A mildly exothermic reaction with essentially no evolution of nitrogen was observed. The mixture was stirred an additional two hours at this temperature, during which time a small amount of nitrogen was evolved. The mixture was rapidly filtered under nitrogen and the dimethylformamide was flash distilled at the lowest pressure obtainable with a vacuum pump and at a temperature below 30° C. This left a red-brown syrup containing the sodium salt of 5-tricyanovinyltetrazole which partially solidified. The syrup was taken up in ice water and treated with a 20% aqueous solution of tetramethylammonium chloride. The resulting precipitate was filtered and dried in vacuo to give an orange-tan powder, 17.5 g. (72%), M.P. 149–150.5° C. (dec. with gas evolution). A portion was further purified by dissolving in acetonitrile with gentle warming. Dropwise addition of ether to the cloud point and cooling to —40° C. yielded short, thick, orange needles, M.P. 150–150.5° C. (dec.) of the tetramethylammonium salt of 5-tricyanovinyltetrazole.

*Analysis.*—Calcd. for $C_{10}H_{12}N_8$: C, 49.18; H, 4.96; N, 45.86. Found: C, 49.09; H, 4.99; N, 45.82.

The infrared spectrum gave no evidence of a free azide group, but showed strong absorption at 4.52μ (conjugated C≡N), and complex absorption between 6.3 and 6.6μ (—C=N and/or N=N—N in a ring). The ultraviolet spectrum showed $$\lambda_{max.}^{CH_3CN} \ 360 \ m\mu \ (K=44.2), \ 237 \ m\mu \ (K=14.9)$$

In water the $$\lambda_{max.}^{H_2O} = 327 \ m\mu$$

but did not obey Beer's law, thus indicating reaction with the solvent. This was borne out by attempted recrystallizations from water and alcohols which resulted in HCN evolution and poor recoveries.

EXAMPLE II

*5-tricyanovinyltetrazole from lithium azide in dimethylformamide*

Nine grams of lithium azide was dissolved in 60 ml. of dry dimethylformamide under nitrogen and the solution cooled to −20° C. A solution of 16.5 g. of tetracyanoethylene in 100 ml. dry dimethylformamide was added dropwise for two hours at −10 to −20° C. After stirring an additional two hours at this temperature, the mixture was filtered under nitrogen and the dimethylformamide flash distilled at the lowest pressure obtainable with a vacuum pump and at a temperature below 30° C. The residual syrup containing the lithium salt was treated as in Example I to give the tetramethylammonium salt. The orange product totalled 14.0 g. (45%), M.P. 149.5–150.5° C. which assayed as 94.7% pure by spectral analysis.

EXAMPLE III

*5-tricyanovinyltetrazole from lithium azide in dimethylacetamide*

The general procedure of Example II was repeated except that dimethylacetamide was used in place of dimethylformamide. 5-tricyanovinyltetrazole was similarly obtained.

EXAMPLE IV

*5-tricyanovinyltetrazole from sodium azide in acetonitrile*

To a suspension of 3.35 g. of sodium azide in 100 ml. of dry acetonitrile at 25° C. was added dropwise a solution of 6.4 g. of tetracyanoethylene in 50 ml. of acetonitrile. A mildly exothermic reaction resulted and was controlled by a cool-water bath. Stirring was continued for an additional two hours at 25° C. Total nitrogen evolved was about 20% of that calculated for the production of nitrogen from azide ion. The solvent was evaporated under nitrogen at 20° C. and the residue assayed at about 78% tricyanovinyltetrazole (as the sodium salt) and 22% bis-(tricyanovinyl)amine.

EXAMPLE V

*5-tricyanovinyltetrazole from lithium azide in acetonitrile*

The general procedure of Example IV was repeated except that the sodium azide was replaced by lithium azide. Again 5-tricyanovinyltetrazole was obtained.

EXAMPLE VI

*5-tricyanovinyltetrazole trihydrate*

A column of particulate nuclear sulfonic acid-type cation-exchange agent was washed with acetonitrile to replace water. The tetramethylammonium salt of tricyanovinyltetrazole, prepared as in Example I, was dissolved in acetonitrile and washed through the column until the washings were colorless. The solution was concentrated at 0° C. under vacuum to give orange clusters, M.P. 38–40° C., $$\lambda_{max.}^{CH_3CN} \ 358 \ m\mu \ (K=63.8)$$

The crystals analyzed as a trihydrate and were quite unstable, $pK_a=3.2$.

*Analysis.*—Calcd. for $HC_6N_7 \cdot 3H_2O$: C, 32.00; H, 3.14; N, 43.54. Found: C, 31.68; H, 3.06; N, 43.58.

EXAMPLE VII

*5-(β-cyano-α,β-di-p-toluenesulfonyl)vinyltetrazole salts*

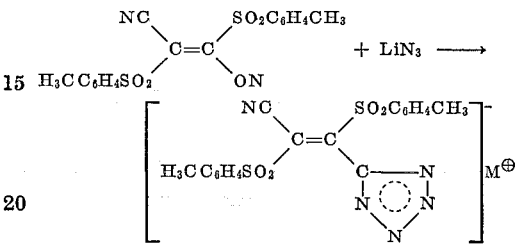

To a solution of 1.35 g. of lithium azide in 75 ml. of dry dimethylformamide cooled to −10° C. was added in one portion 9.65 g. of 1,2-bis(p-toluenesulfonyl)-1,2-dicyanoethylene. The solution turned a deep red-orange. It was stirred for one hour at −10° C., then filtered when under nitrogen and evaporated under vacuum while still cold. The residual glass (containing the lithium salt of 5 - (β-cyano-α,β-di-p-toluenesulfonyl)vinyltetrazole) was taken up in acetone and treated with a cold 20% aqueous solution of tetramethylammonium chloride. There was obtained 6.9 g. of a yellow-orange tetramethylammonium salt of 5-(β-cyano-α,β-di-p-toluenesulfonyl)vinyl-tetrazole, M.P. 88–92° C. (55%). The solid was unstable to heat and hydroxylic solvents. It was recrystallized from acetone-ether, M.P. 94–95° C. and $$\lambda_{max.}^{CH_2Cl_2} \ 393 \ m\mu \ (K=227)$$

*Analysis.*—Calcd. for $C_{22}H_{26}N_6S_2O_4$: C, 52.57; H, 5.22; N, 16.72. Found: C, 52.67; H, 5.16; N, 17.07.

The silver salt of 5-(β-cyano-α,β-di-p-toluenesulfonyl)-vinyltetrazole, prepared by a metathetical reaction of $AgNO_3$ with the tetramethylammonium salt, had a decomposition point of about 275° C.

*Analysis.*—Calcd. for $C_{18}H_{14}N_5S_2O_4Ag$: C, 41.68; H, 2.57; N, 12.78. Found: C, 41.58; H, 2.57; N, 13.34.

The 1,2 - dicyano - 1,2 - bis (p-toluenesulfonyl)ethylene was obtained as follows: To a solution of 294 g. of dichlorofumaronitrile in 2300 g. of dimethylformamide was added in small portions 356 g. of powdered anhydrous sodium p-toluenesulfinate, the temperature being maintained at 10–20° C. The reaction mixture was diluted with cold water and the 1,2-dicyano-1,2-bis(p-toluenesulfonyl)ethylene filtered. The compound was crystallized from methylene chloride to give 180 g. of faintly yellow needles, M.P. 245–7° C. (dec.).

*Analysis.*—Calcd. for $C_{18}H_{14}O_4N_2S_2$: C, 55.94; H, 3.65; N, 7.26; S, 16.58. Found: C. 56.21; H, 3.67; N, 6.78; S, 16.66.

EXAMPLE VIII

*5-(pentacyano-1,3-butadienyl)tetrazole salts*

$(NC)_2C=C(CN)-C(CN)=C(CN)_2 + LiN_3 \longrightarrow$

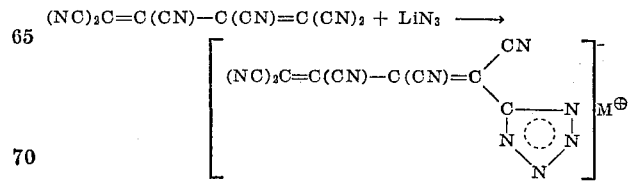

The general reaction of Example VII was repeated except that hexacyanobutadiene and acetonitrile were used with lithium azide. The lithium salt of 5-(pentacyano-1,3-butadienyl)tetrazole was obtained. This was converted to the tetramethylammonium salt. The latter, after crystallization from ethylene chloride, had a melting point of 98–99.3° C. and $$\lambda_{max}^{CH_2Cl_2} \ 398 \ m\mu \ (K=30.6)$$

*Analysis.*—Calcd. for $C_{14}H_{12}N_{10}$: C, 52.49; H, 3.78; N, 43.73. Found: C, 52.26; H, 4.01; N, 43.61.

Hexacyanobutadiene was prepared as follows:

A solution of 200 g. of tetracyanoethane in 4,365 g. of 1,2-dimethoxyethane was added slowly to a suspension of 66 g. of sodium hydride-mineral oil dispersion (56.5% NaH). The yellow solution of monosodium tetracyanoethylenide which formed was agitated for two hours at room temperature. It was then heated at reflux for one hour. The reaction mixture was filtered and the filtrate evaporated to dryness. The residue was washed with ether and then dissolved in acetonitrile. The acetonitrile solution was filtered and the filtrate evaporated to dryness to yield 60 g. of cis-disodium 1,1,2,3,4,4-hexacyano-2-butenediide, which was identified by its infrared absorption spectrum.

A suspension of 122 g. of cis-disodium 1,1,2,3,4,4-hexacyano-2-butenediide was agitated for 15 minutes at room temperature in 7,975 g. of carbon tetrachloride containing 200 g. of bromine. The white suspension of hexacyano-1,3-butadiene and sodium bromide was removed by filtration. The sodium bromide was removed by washing with water. Hexacyano-1,3-butadiene (40 g.) remained and was identified by its infrared spectrum.

EXAMPLE IX

*2-methyl-5-tricyanovinyltetrazole*

A mixture of 5.71 g. of tetramethylammonium-5-tricyanovinyltetrazole, 50 ml. of dry $CH_3CN$, and 3.15 g. of methyl sulfate was stirred at room temperature for 24 hours. The reaction mixture was diluted with 200 ml. of ice water and extracted with three 75 ml. portions of ether. The extracts were dried over magnesium sulfate and concentrated in vacuo to give a red oil. The oil was taken up in 1:5 ether:benzene and chromatographed on acidic alumina. It was eluted with 10–50% ether in benzene and the solid, obtained by removal of solvent, sublimed to give 41% yield of 2-methyl-5-tricyanovinyltetrazole, M.P. 97–97.5° C.

*Analysis.*—Calcd. for $C_7H_3N_7$: C, 45.40; H, 1.63; N, 52.97. Found: C, 45.40; H, 1.80; N, 52.83.

The structure was further proved by degradation to the known 2-methyl-5-tetrazole carboxylic acid.

When lithium azide is reacted with 1,2-dicyano-1,2-di(trifluoromethyl)ethylene in dimethylformamide, there is obtained the corresponding 5-($\beta$-cyano-$\alpha,\beta$-ditrifluoromethyl)vinyltetrazole as its lithium salt. The 1,2-dicyano-1,2-di(trifluoromethyl)ethylene was produced as follows:

To a stirred solution of 232 g. of phosphorus pentoxide in 1564 g. of concentrated sulfuric acid at 85–95° C. was added gradually 400 g. of commercial trifluoroacetaldehyde hydrate over a period of three hours. The gaseous trifluoroacetaldehyde which formed was cooled to 0° C. and passed into a stirred mixture of 105 g. of hydrogen cyanide, 107 g. of diethyl ether and one g. of pyridine maintained at 0–10° C. The resulting ether solution was warmed to room temperature and about four parts by weight of concentrated sulfuric acid added. Fractional distillation yielded 186 g. of trifluoroacetaldehyde cyanohydrin as a colorless liquid boiling at 80–85° C./66 mm. Hg. It was stabilized by adding a trace of sulfuric acid.

To a mixture of one g. of ammonium chloride and 119.2 g. of thionyl chloride which had been heated at reflux for 15 minutes and then cooled to 0–10° C. was added 127 g. of trifluoroacetaldehyde cyanohydrin. The resulting mixture was heated at reflux for 10 hours. Fractional distillation of the product yielded 129 g. of 1-cyano-2,2,2-trifluoroethylchlorosulfite boiling at 40–42° C./10 mm. Hg.

In a reactor fitted with a large reflux tube and swept with nitrogen 200 g. of sulfur was heated until refluxing vigorously. Over a period of one hour 45.5 g. of 1-cyano-2,2,2,-trifluoroethylchlorosulfite was slowly added to the refluxing vapors. The off-vapors were cooled to −80° C., the resulting condensate was warmed to room temperature to remove sulfur dioxide, and the residue was distilled initially at 1 mm. Hg. The condensate collected at −80° C. was fractionally distilled at atmospheric pressure to yield 14.5 g. of 1,2-dicyano-1,2-di(trifluoromethyl) ethylene boiling at 100–104° C.

In a corresponding manner, 1,2-dicyano-1,2-di(heptafluoropropyl)ethylene can be prepared and reacted with azide ion to give 5-($\beta$-cyano-$\alpha,\beta$-dipentafluoropropylvinyl)tetrazole ion. Furthermore, chlorotricyanoethylene and 1,2-dichloro-1,2-dicyanoethylene react with an alkali metal azide in the manner of the preceding examples to give alkali metal salts of 2-chlorodicyanovinyltetrazole and 5 - ($\beta$-cyano-$\alpha,\beta$-dichlorovinyl)tetrazole. Cis- and trans-1,2-dicyano-1,2-difluoroethylenes (obtained by heating chlorofluoroacetonitrile to 700° C.,) react with azide ion to give 5-($\beta$-cyano-$\alpha,\beta$-difluorovinyl)tetrazole.

The following description illustrates the use of the tetrazoles of this invention as propellants:

Equivalent weights of the tetrazole and potassium perchlorate were ground in a mullite mortar. The two were intimately mixed in the mortar and then packed into a small cartridge constructed of 1 mil brass foil (approximately 2 mm. diameter x 12 mm. long, crimped shut at one end). The cartridge was placed in the lower end of an inclined copper tube (9 mm. ID x 1 mm. wall) with the crimped end put in the tube first, the open end to the rear. The cartridge was then ignited with a remotely operated gas-burner and was propelled from the tube.

The tetrazole of Example I was quite effective. That from Example VII was not as effective. The tetrazole from Example VIII was equivalent to that of Example I but was slightly shock-sensitive when mixed with potassium perchlorate.

The new tetrazoles of this invention as obtained by the general process described above are formed initially as salts of the general formula

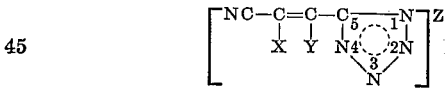

wherein Y is cyano, hydrocarbylsulfonyl, chlorine, fluorine, or perfluoroalkyl, X is the same as Y or cyanocarbyl, and Z is a positive ion (e.g., metal ion), hydrogen or alkyl radical. In the above formula the isomeric forms in which the conjugated nuclear double bonds can be in the 1–2 and 4–5, as well as the 2–3 and 4–5, positions are both probably involved and are embraced in the above formula for the new compounds of this invention. With such forms, it is evident that Z cannot be rigorously defined as bonded to specifically the 1 or 2 nitrogen, particularly when Z is an ion. In the above formula Z can be alkyl, hydrogen, ammonium, metal ion, or tetraalkyl ammonium. The alkyl groups are generally lower, i.e., 1–8 carbons. By the reaction of an alkali metal or ammonium azide, preferably of an alkali metal of atomic number up to 37, i.e., Li, Na, K, Rb azides, and ammonium and quaternary (lower alkyl) ammonium azides, the corresponding salt is obtained, i.e., where Z is Li, Na, K, Rb, $NH_4$, or $N(alk)_4$. These primary salts can be converted to other derivatives through customary exchange reactions to form (1) the free acid (Z=H), (2) alkyl derivatives (Z=hydrocarbon, especially lower alkyl, e.g., methyl, ethyl, butyl, etc.) by action of an alkali metal carbon halide or hydrocarbon sulfate, and (3) other metal derivatives (Z=Cu, Zn, Mg, Al, Fe, Pb, Bi, etc.). For the latter, the number of tetrazole nuclei combined to each metal can be as high as the formal valence of the specific metal.

The new tetrazoles of this invention are generally deeply colored. They decompose at their melting points, and, in general, are unstable at temperatures of about 80° C. or higher. They are also unstable in the presence of hydroxylic solvents.

These tetrazoles are useful as blowing agents. For example, when incorporated in a semi-solid to liquid polymeric material, in amounts of 0.1% or more, and heated to about 150° C., porosity in the product results. They are particularly useful as propellant ingredients in the manner previously described.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Tetrazole compounds of the formula

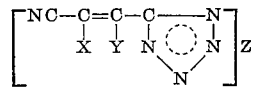

wherein
   X is a member selected from the class consisting of chlorine, fluorine, cyano, cyanocarbyl containing up to 4 carbon atoms in the carbyl group, hydrocarbylsulfonyl containing up to 7 carbon atoms, and perfluoroalkyl containing up to 3 carbon atoms,
   Y is a member selected from the class consisting of chlorine, fluorine, cyano, hydrocarbylsulfonyl containing up to 7 carbon atoms, and perfluoroalkyl containing up to 3 carbon atoms, and
   Z is a member selected from the class consisting of hydrogen, ammonium ion, alkyl containing up to 8 carbon atoms, tetraalkyl ammonium wherein each alkyl thereof contains up to 8 carbon atoms, and ions of metals selected from the class consisting of alkali metals, silver, copper, zinc, magnesium, aluminum, iron, lead and bismuth.

2. Tetrazole compounds of the formula

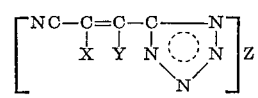

wherein
   X and Y are cyano, and
   Z is an alkali metal ion.

3. Tetrazole compounds of the formula

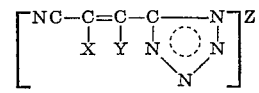

wherein
   X and Y are cyano, and
   Z is alkyl containing 1 to 8 carbon atoms inclusive.

4. Tetrazole compounds of the formula

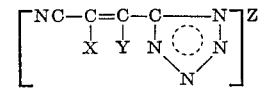

wherein
   X and Y are hydrocarbylsulfonyl containing up to 7 carbon atoms in the hydrocarbon group, and
   Z is tetraalkyl ammonium wherein each alkyl thereof contains 1 to 8 carbon atoms inclusive.

5. Tetrazole compounds of the formula

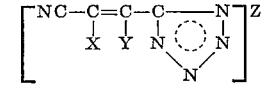

wherein
   X and Y are perfluoroalkyl containing up to 3 carbon atoms, and
   Z is ammonium ion.

6. 5-tricyanovinyltetrazole.

7. 5-tricyanovinyltetrazole trihydrate.

8. The silver salt of 5-(β-cyano-α,β-di-p-toluenesulfonyl)vinyltetrazole.

9. The tetramethyl ammonium salt of 5-(pentacyano-1,3-butadienyl)tetrazole.

10. 2-methyl-5-tricyanovinyltetrazole.

11. Process which comprises reacting, at a temperature in the range from −40° C. to +30° C. and in the presence of a liquid inert to the reactants, a member selected from the class consisting of alkali metal azide and ammonium azide with a polycyanoethylene of the formula

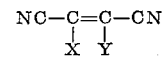

wherein
   X is a member selected from the class consisting of chlorine, fluorine, cyano, cyanocarbyl, hydrocarbylsulfonyl, and perfluoroalkyl, and
   Y is a member selected from the class consisting of chlorine, fluorine, cyano, hydrocarbylsulfonyl, and perfluoroalkyl, and obtaining as a resultant thereof a tetrazole compound bearing a cyanovinyl group in the 5-position.

12. Process which comprises reacting, at a temperature in the range from −40° C. to +30° C. and in the presence of a lower alkanoamide, a member selected from the class consisting of alkali metal azide and ammonium azide with a polycyanoethylene of the formula

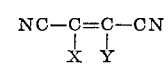

wherein
   X is a member selected from the class consisting of chlorine, fluorine, cyano, cyanocarbyl, hydrocarbylsulfonyl, and perfluoroalkyl, and
   Y is a member selected from the class consisting of chlorine, fluorine, cyano, hydrocarbylsulfonyl, and perfluoroalkyl, and obtaining as a resultant thereof a tetrazole compound bearing a cyanovinyl group in the 5-position.

13. Process which comprises reacting, at a temperature in the range from −40° C. to +30° C. and in the presence of a nitrile, a member selected from the class consisting of alkali metal azide and ammonium azide with a polycyanoethylene of the formula

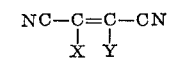

wherein
   X is a member selected from the class consisting of chlorine, fluorine, cyano, cyanocarbyl, hydrocarbylsulfonyl, and perfluoroalkyl, and
   Y is a member selected from the class consisting of chlorine, fluorine, cyano, hydrocarbylsulfonyl, and perfluoroalkyl, and obtaining as a resultant thereof a tetrazole compound bearing a cyanovinyl group in the 5-position.

14. Process which comprises reacting, at a temperature in the range from −40° C. to +30° C. and in the presence of a lower alkanoamide, an alkali metal azide with tetracyanoethylene and obtaining as a resultant thereof a tetrazole compound bearing a cyanovinyl group in the 5-position.

15. Process which comprises reacting, at a temperature in the range from −40° C. to +30° C. and in the presence of dimethylformamide, an alkali metal azide with a compound of the formula

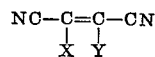

wherein

X and Y are hydrocarbylsulfonyl containing up to 7 carbon atoms in the hydrocarbon group and obtaining as a resultant thereof a tetrazole compound bearing a cyanovinyl group in the 5-position.

16. Process which comprises reacting, at a temperature in the range from $-40°$ C. to $+30°$ C. and in the presence of acetonitrile, lithium azide with hexacyanobutadiene and obtaining as a resultant thereof the lithium salt of 5-(pentacyano-1,3-butadienyl)tetrazole.

References Cited
UNITED STATES PATENTS 2,977,372  3/1961  Finnegan et al. _____ 260—308

ALTON D. ROLLINS, *Primary Examiner.*

D. T. McCUTCHEN, *Assistant Examiner.*